Nov. 3, 1964    K. CHEN    3,155,324
CEILING LIGHTING FIXTURES
Filed Aug. 23, 1961    3 Sheets-Sheet 1

WITNESSES

INVENTOR
Kao Chen
BY
ATTORNEY

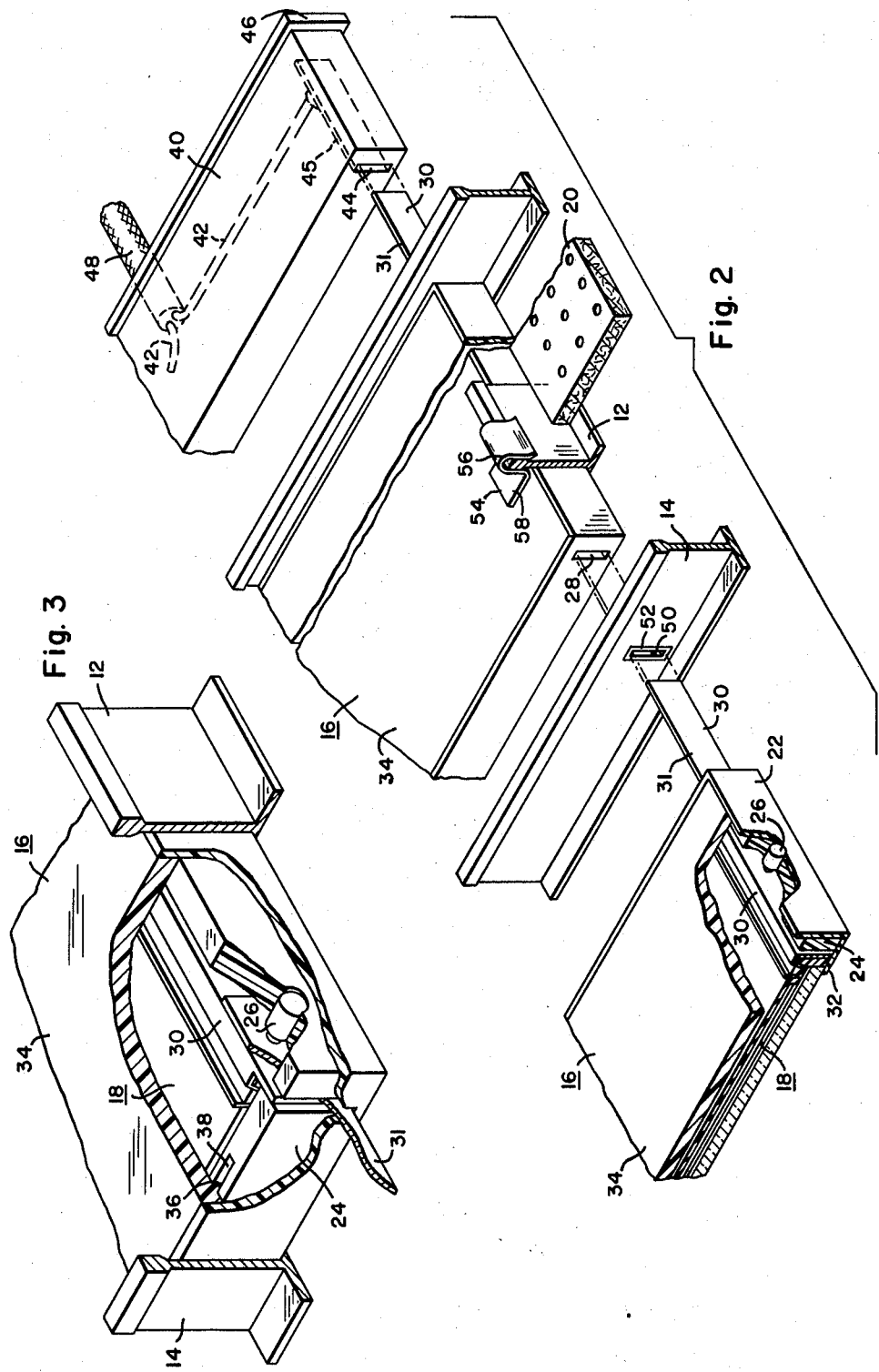

Nov. 3, 1964 K. CHEN 3,155,324
CEILING LIGHTING FIXTURES
Filed Aug. 23, 1961 3 Sheets-Sheet 3

United States Patent Office 3,155,324
Patented Nov. 3, 1964

3,155,324
CEILING LIGHTING FIXTURES
Kao Chen, Cedar Grove, N.J., assignor to Westinghouse Electric Corporation, East Pittsburgh, Pa., a corporation of Pennsylvania
Filed Aug. 23, 1961, Ser. No. 133,347
8 Claims. (Cl. 240—9)

This invention relates generally to lighting fixtures, and more particularly to fixtures for supporting electroluminescent structures adjacent to or recessed in a ceiling arrangement either singly or in continuous rows.

Until the present invention, electroluminescent panels otherwise suitable for wall or ceiling lighting have not been readily adaptable for efficient supporting adjacent to or within such wall or ceiling. Prior experimental installations generally required elaborately built wooden frames, with separate copper strips embedded in the wood frame for forming a system for connection of the electroluminescent panels to a power source. Such experimental installations involved such substantial labor and material costs that they were too impractical for commercial applications. Furthermore, ready removal of one panel with respect to another from any ceiling network was not easily accomplished in such experimental installations.

Accordingly, it is an object of the present invention to provide inexpensive and relatively efficient fixtures for electroluminescent structures.

Another object of the present invention is to provide fixtures for electroluminescent panels, the fixtures being readily adapted to support these panels in those suspended or recessed ceiling systems otherwise well known in the trade.

Another object of the present invention is to provide a lightweight fixture for readily releasably containing an electroluminescent panel structure therein.

A still further object of the present invention is to provide a supporting structure for electroluminescent panels such that adjacent panels in a row may be readily interconnected with one another and to a single source of electric power.

Still another object of the present invention is to provide fixtures for electroluminescent panels which can be readily adapted to receive the relatively larger sizes and various configurations of such panels as may be required in any particular instance.

A still further object of the present invention is to provide a frame-type fixture for electroluminescent panels, which fixture desirably is fabricated from a plastic or other suitable material and can be easily dropped into a ceiling system, such as a typical grid system, between main T supporting structures and cross-T supporting structures.

A further object of the present invention is to provide a readily removable back cover for a frame-type fixture for an electroluminescent panel so that access to the electroluminescent panel held within that frame can be had by simply removing the back cover, with the back cover serving to contain the panel within the fixture and as a dust shield.

Still another object of the present invention is to provide electrical connections between adjacent electroluminescent panels mounted in a row by a sliding engagement between projecting electric connectors of the fixtures.

A further object of the present invention is to provide a novel terminal connection structure which accommodates incoming electric line conductors.

Another object of the present invention is to provide for a continuous electric conductor structure in a row of electroluminescent type fixtures.

Still another object of the present invention is to provide interengagement between a lighting fixture and an electroluminescent panel such as to form a moisture barrier and dust shield around the edges and the back of the electroluminescent panel.

A further object of the present invention is to provide novel electroluminescent panel arrangements particularly well adapted for use with the novel fixture structures of the invention.

It is thus seen that the present invention relates to fixtures for containing electoluminescent panels in a moisture-proof but readily releasable condition. The panels can be readily releasably interconnected, both structurally and electrically, with adjacent panels in a row. The present invention further comprehends a fixture which can be readily adapted to be employed in all common types of ceiling constructions presently known, such as the usual suspended ceiling types often referred to as grid, flange, recessed, or the like. It is desired that the frame of the fixture of the present invention be of a lightweight material, such as plastic, which also provides an electric insulating function. The fixture of the present invention renders practical the application of electroluminescent panels of various sizes to ceiling and wall structures heretofore not feasible.

The above and other objects of the invention will become more apparent upon consideration of the following detailed description of illustrative embodiments thereof when taken in connection with the attached drawings, in which:

FIG. 2 is an enlarged and exploded isometric view of a portion of the ceiling arrangement shown in FIG. 1, with portions thereof broken away;

FIG. 3 is an enlarged view of a corner section of a lighting fixture constructed according to the principles of the present invention and having an electric connector from an adjacent fixture engaged therewith, with portions thereof broken away;

Figure 1:
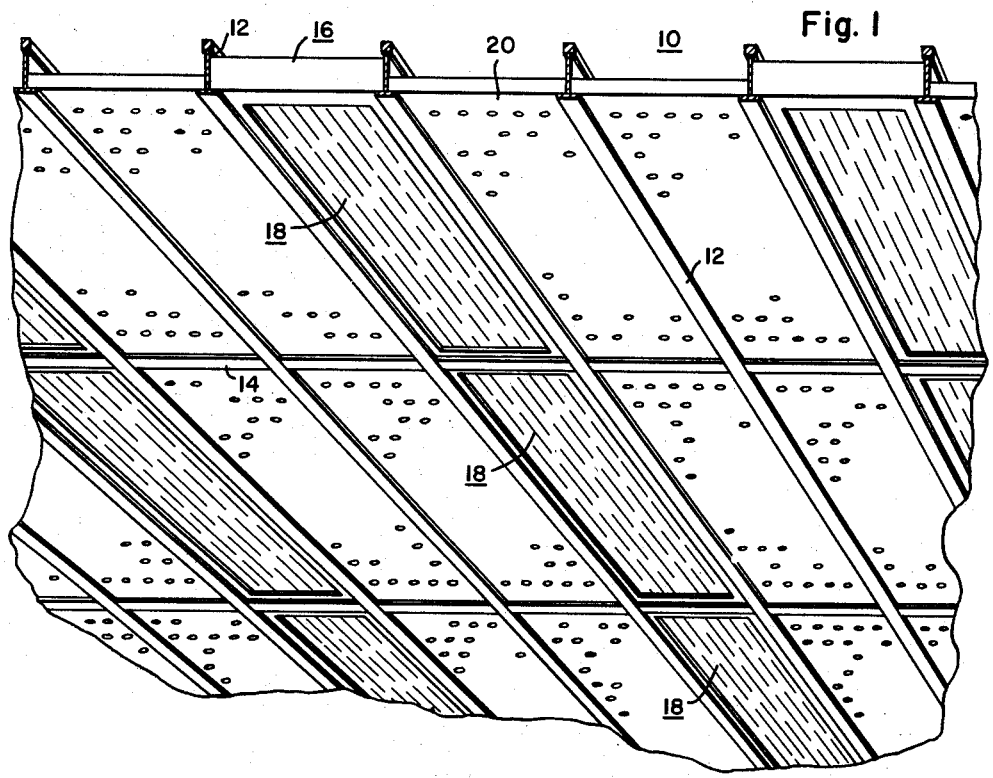
FIG. 1 is a portion of a ceiling arrangement partially in section and containing lighting fixtures constructed according to the principles of the present invention.

There is illustrated in FIG. 1 a suspended ceiling-type construction 10 of the typical "grid" type formed substantially of elongated main T structural support members 12 and cross-T support members 14. Supported within the rectangular areas defined by the main T's 12 and cross T's 14 are lighting fixtures 16 containing electroluminescent structures or panels 18. Also positioned between other rectangular areas of the grid system are typical perforated ceiling panels 20 made of asbestos or the like. It is understood that the grid system employed in the ceiling arrangement 10 is for illustrative purposes only and that other typical ceiling constructions such as the well-known "flange" type "T-bar" type, "recessed" type, or the like, can be equally well used with obvious modifications of the outside portions of the lighting fixture 16. For example, see the ceiling flange connection employed in Patent No. 2,962,582, issued November 29, 1960 to W. C. Croft, assigned to The Pyle National Company of Chicago, Illinois, and entitled "Combined Lighting and Ventilating Unit." Such other ceiling arrangements are so well known that they are not here illustrated since the details thereof do not comprise a part of the present invention.

Upon viewing the more detailed illustration of the present invention in FIGS. 2 and 3, it can readily be seen that the fixture 16 comprises an outer L-shaped frame 22 and an inner rectangular frame 24 on all sides thereof. Both the outer and inner frame members 22 and 24, respectively are preferably made of a lightweight plastic material such as polyethylene or the like. The purpose of having a separate inner frame from the outer frame, outside of increased rigidity, is so that the fixture can obtain friction catches 26, preferably spring loaded, molded into the inner frame so that the back wall of the catches can rest against the outer frame 22. Two sides of each fixture have narrow slots 28 permitting copper bus bar extensions 31 to extend therethrough and establish a quick means of electric and physical connection between adjacent electroluminescent panels 18.

Bus bars 30 of each fixture are supported on the lower flange 32 of the outer rim or frame 22 and are located closely adjacent but spaced from inner frame 24. This spacing permits the insertion of the extension 31 of another bus bar 30 from an adjacent panel 18 to fit in between the bus bar of the first panel and the inner frame 24. The inserting extension 31 is then frictionally engaged between a cooperating bus bar 30 and a bullet catch 26 as readily seen in FIG. 3, for example.

The fixture 16 further includes a back cover 34 for locking electroluminescent panel 18 in the fixture 16. This back cover is preferably formed of the same plastic material as are the frames 22 and 24 and is provided with tongue portions 36 for engaging grooves 38 of the inner frame 24 for frictional engagement therewith. The back cover piece 34 fits snugly within the perimeter of the frame 22 and due to its resilient character is firmly engaged in position when the tongues 36 are engaged with the grooves 38. The back cover 34 thus serves as a keeper for holding the electroluminescent panel 18 in firm position within the fixture 16 and as a dust shield to keep dirt from entering within the fixture. It is to be understood that materials other than polyethylene plastics can be used for the construction of the frames and the back cover, such as certain woods. Bakelite, polymer and copolymer family compounds are generally desirable materials to use also.

The outer frame 22 is supported by the lower flanges of the T's 12 and 14, as clearly illustrated in FIGS. 2 and 3 for example. When a row of these frames are mounted, the endmost bus bar 30 receives its electrical energy from a terminal connection box 40 which facilitates incoming feeder connections 42 from an outside power potential (not shown). This terminal connection box is generally made of the same material as the fixture 16 and contains two sleeves 44 (only one shown) for receiving bus bar extensions 31, the sleeves being molded in the terminal connection box as an integral part if desired. The feeder connections 42 are engaged with bus contacts 45 by soldering or the like. The bus contacts can be made of the same material as the bus bars 30. Extensions 31 of the bus bars 30 slidably abut against the bus contacts 45 when inserted in sleeves 44 to make the electrical contact. The terminal connection box 40 contains a cover 46, removably secured in any expedient way, and a clamping device (not shown) for clamping the cable 48 to the terminal connection box 40. The reason for the removable cover 46 is to gain ready access to the interior of the box 40 to make connections between the component parts thereof when necessary.

From the above description and the drawing it can be seen that connections between adjacent fixtures and panels in a row can be made by sliding the extensional end 31 of one copper bus bar 30 under the nearest spring-loaded bullet catch 26 of an adjacent fixture to engage the bus bar 30 thereof. Since this must be done through T's 14, properly sized slots 50 must be cut in the T's as required. Bus connection insulating sleeves 52 are located in the precut slots to provide insulation between the electric conducting buses 30 and the supporting T's 14. It is understood that if the lighting fixture of this invention is used in a ceiling construction requiring no cross T's or if the cross T's are low enough that the bus bar extensions or the fixtures themselves pass freely over them, then no insulating sleeves 52 or slots 50 will be necessary. However, considerable bare length of extensions 31 should always be avoided in the latter instances by placing adjacent fixtures close to one another in an interengaged relationship.

The fixture 16 can be easily dropped into the grid ceiling arrangement, as illustrated in FIGS. 1 to 3, between the main T's 12 and cross T's 14, as described previously. The dimensions between T's should be such that the fixtures fit closely within the grid openings. No fastening or hanging devices are required therefor, other than hold-down spring-type clips 54 to keep the lightweight fixtures 16 in place. These clips 54 are desirably made of a resilient metallic material having a U-shaped clamping portion 56 for frictionally engaging the top of a T and a holding portion 58 for engaging the back cover 34 of the fixture 16. In viewing FIG. 4 it can be seen that mounting holes 60 can be provided in the corners of the fixture 16 so that the fixture can be readily mounted on any wood frame, wall or ceiling by a direct screwing or nailing operation, thus providing facilities for either surface or recessed mounting.

Figure 4:
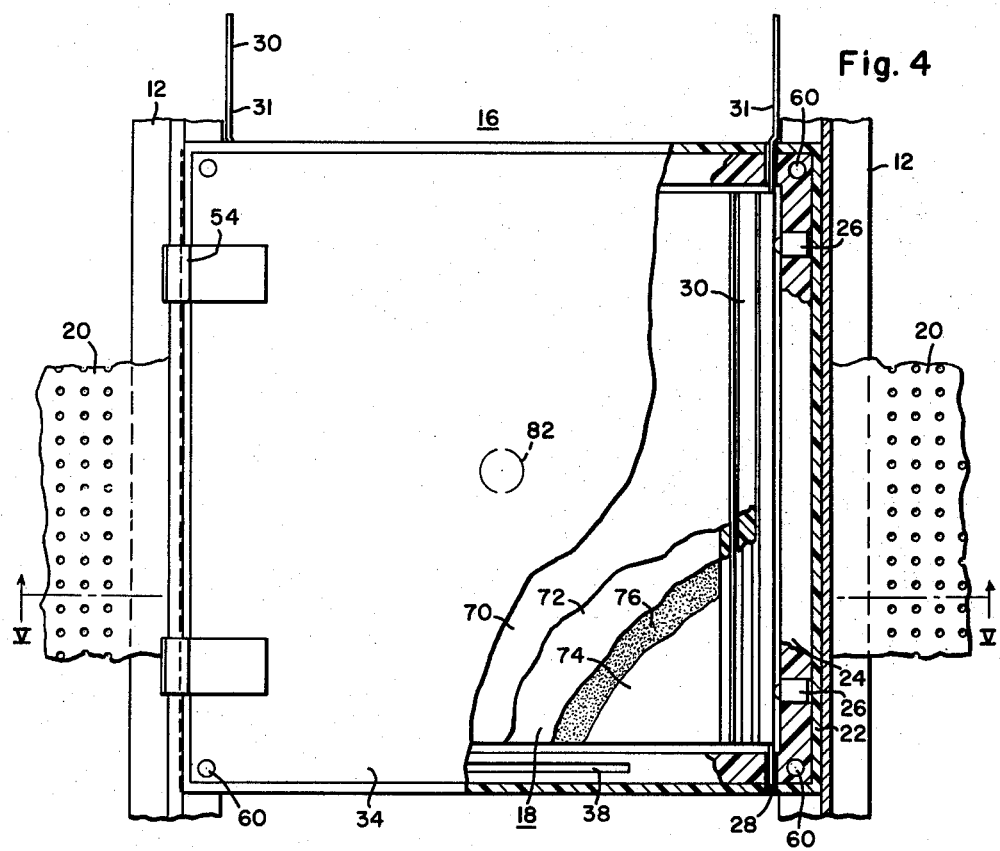
FIG. 4 is a top plan view of a lighting fixture and its contained electroluminescent panel showing the details of that panel and its electric connection with the frame.

Bus bars 30 desirably are of a silver-plated copper material with approximately 98% conductivity although some variation from this is recognized as being permissible. Their upper portion 62 generally can take the form of a trapezoid in cross-section in order to have a flat surface 64 for ready engagement with the top of the electroluminescent panel 18. The sides 66 of a bus bar can be generally flat and are urged tightly against the electroluminescent panel 18 by the side pressure exerted from the spring-loaded bullet catches 26 and by the top pressure exerted by the back cover 34. Extension 31 of bus bar 30 generally offsets the width of a side 66 of the bus bar to facilitate a juxtaposed position with the bus bar 30 in an adjacent fixture. That is, when the extension 31 of a fixture such as shown in FIG. 4 is inserted in a slot 28 of an adjacent fixture (see FIG. 2), it will slide in along the side wall 66 of the adjacent fixture next to its bus bar 30 for a snug fit between the bullet catch 26 and the side wall 66 of that adjacent fixtures bus bar.

Figure 5:
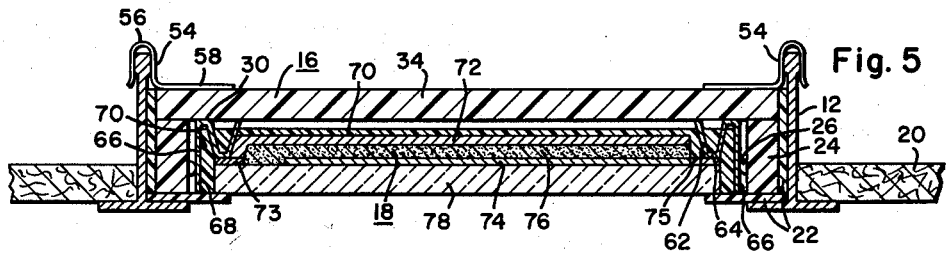
FIG. 5 is a cross-sectional view of the arrangement of FIG. 4 taken substantially along the reference line V—V thereof.

Electroluminescent panels can be elongated and arranged in a generally flat area to produce a uniformly distributed soft light energy. Such a structure is that illustrated in FIGS. 4 and 5 as the electroluminescent panel 18, this being a novel form of such an exemplary structure for particular use in the fixture of this invention. In this modification, there is purposely left a gap or space 68 between the electroluminescent lamp side, the sides of the electroluminescent lamp or panel 18 and the side 66 of the bus bar 30 for an epoxy or other encapsulation 70 to be inserted. This encapsulation serves to seal the fixture from outside moisture, dust, and the like. The encapsulation 70 surrounds both sides and the top of the electroluminescent structure 18.

As is well known in the prior art, an electroluminescent lighting structure utilizes a film of phosphor dispersed in a dielectric and placed between two conducting plates. One of the plates should be formed on a light-transmitting material in order for the light generated by the transformation of electrical energy to emerge. Light is emitted when an alternating or fluctuating voltage is impressed across the conducting plates having this phosphor disposed therebetween. In this particular embodiment, the upper conducting plate or electrode 72, portion 73 being an extension of that electrode, and lower conducting plate or electrode 74, portion 75 being an extension of that electrode have the phosphor dielectric area 76 located therebetween. The phosphor can be copper-activated zinc sulphide, one part by weight of which is embedded in two parts by weight of a light-transmitting dielectric material, such as polyvinyl chloride. The back or upper electrode 72 can be comprised primarily of an aluminum overlayer.

The front or lower electrode 74 can be formed of an electrically conducting coating on a light-transmitting glass 78 or the like. Accordingly, when (as seen from FIG. 5) the left-hand bus bar 30 energizes the upper electrode 72 and the right-hand bus bar excites the lower electrode 76 when an electrical potential is applied thereto, light is transmitted through the glass plate 78.

Figure 6:
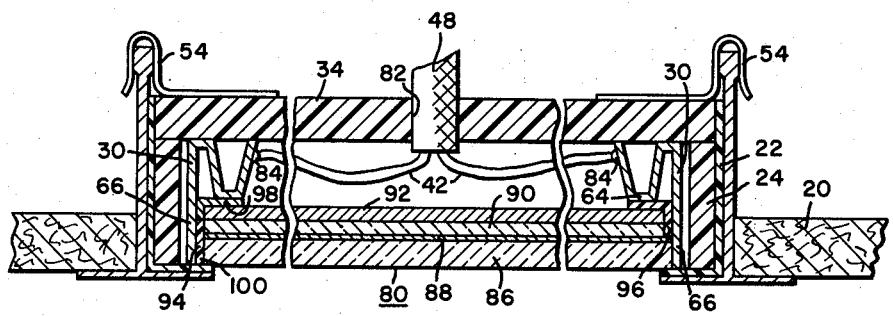
FIG. 6 is a cross-sectional view similar to FIG. 5 only showing a modified arrangement thereof.

There is illustrated in FIG. 6 an electroluminescent panel 80, which can be used instead of electroluminescent panel 18 previously described, particularly when not used. The arrangement of FIG. 6, which is somewhat enlarged over the scale used for panel 18 in FIG. 5 so as to bring out certain details, is primarily adapted for a lighting fixture which is not to be mounted in a row but which is to be individually mounted and energized by an electric cable 48 extending through the top cover 34 through means of a cutout 82 formed in that back cover. The electric conductors 42 are soldered at 84 to the left and right-hand bus bars 30 as viewed in FIG. 6. The electroluminescent panel 80 comprises a bottom glass plate 86, an electrical conducting coating forming a front electrode 88, a phosphor dielectric layer 90 and a top back electrical conducting electrode 92 as an overlayer. The materials used in the electrodes, phosphor and dielectric are those similar to those used in the modification of FIG. 5, respectively. The modification of FIG. 6 differs from that of FIG. 5 substantially in that end caps 94 and 96 are located on the left and right-hand edges of the panel 80 as viewed in FIG. 6. The right-hand cap 96 engages the back electrode 92 but does not engage the front electrode 88. The right-hand cap 96 is made of some highly conducting metal such as copper or aluminum. The left-hand cap 94 is made of an insulated top portion 98 which serves to insulate the left-hand bus bar 30 from the back electrode 92, and of an electric conducting material 100 which serves to conduct electricity from that bus bar 30 to the bottom electrode 88. In this manner then, when an electric potential is applied through the leads 42 to the separate bus bars 30 on each side of the electroluminescent panel 80, the front and back electrodes are energized so as to induce the transmission of light through the glass plate 86.

Returning to FIG. 4, it can be seen that an indicated knockout 82 similar to that employed in FIG. 6 can be made so that this arrangement is also adapted for individual installation. When this occurs, the portion indicated as 82 is knocked out for the electric cable 48 to enter and the extension 31 of the bus bars 30 are simply cut off.

There has thus been described a lighting fixture comprising a frame, an interlocking back panel, an electroluminescent cell, and energized bus bars. The bus bars can be contoured so as to be pressed against the electroluminescent cell contacts by the back panel and spring-loaded catch members provided along the sides of the frame. When the fixtures are to be mounted in rows with adjacent fixtures, ends of the bus bars can protrude beyond one end of the fixture to permit plug-in contacts with adjacent fixtures through suitable slots in the adjacent end of the frame and supporting members. Such an arrangement insures a positive and easy connection of adjacent units in a row of such fixtures. A single terminal connecting box can be used to energize an entire row of such fixtures.

Since it is obvious that the invention can be embodied in other forms and constructions within the spirit and scope thereof, as will be apparent to one skilled in the art, it is to be understood that the particular forms shown are but a few of such embodiments. Accordingly, the descriptive material herein is to be taken as illustrative of the invention and not as limitative thereof. Moreover, it is to be understood that certain features of the invention can be employed without a corresponding use of other features thereof.

I claim as my invention:

1. A lighting fixture comprising a peripheral frame of insulating material encompassing said fixture, opposing bus bars extending along inner sides of said fixture and supported by said frame, said bus bars having extensions extending through said frame and outwardly therefrom, the sides of said bus bars being spaced from the sides of said frame to form a bus bar extension receiving channel, slots in said frame in registration with said channel, said bus bar extensions being offset to generally coincide with said channel, whereby bus bar extensions from another similar fixture frictionally engage said bus bar extension receiving channel to electrically contact said bus bars, an electroluminescent panel located generally between said bus bars and supported by said frame, cover means tightly engaging said frame above the non-light producing side of said panel, said cover means being coextensive with the periphery of said frame for holding said panel in position and preventing undesirable material from entering said fixture, and means for electrically connecting said bus bars to an energized electric potential and said panel.

2. A lighting fixture comprising a peripheral frame encompassing said fixture and having an inwardly disposed L-shaped cross-section, opposing bus bars extending along inner sides of said fixture and supported by the bottom portion of said frame, said bus bars having extensions extending through said frame and outwardly therefrom, the sides of said bus bars being spaced from the side portions of said frame to form a bus bar extension receiving channel, slots in said frame in registration with said channel, said bus bar extensions being offset to generally coincide with said channel, whereby bus bar extensions from another similar fixture frictionally engage said bus bar receiving channel to electrically contact said bus bars, an electroluminescent panel extending generally between but spaced from the sides of said opposed bus bars and being supported by the bottom portion of said frame, a top portion of said bus bars overlapping and engaging said panel, an encapsulation formed in the spaces between said bus bars and said panel and around the non-light producing side of said panel to serve as a moisture seal, the encapsulation permitting exposure of the outer surfaces of said bus bars for electrical contact with bus bar extensions from another fixture, cover means tightly engaging said frame above the non-light producing side of said panel, said cover means being coextensive with the periphery of said frame for holding said panel in position and preventing undesirable material from entering said fixture, and means for electrically connecting said bus bars to an energized electric potential and said panel.

3. A lighting fixture comprising a peripheral frame encompassing said fixture, opposing bus bars extending along inner sides of said fixture and supported by said frame with sides of said bus bars being spaced from corresponding sides of said frame, an electroluminescent panel extending generally between but spaced from the sides of said opposed bus bars and being supported by said frame, said electroluminescent panel being of the type comprising a film of phosphor dispersed in a dielectric between two conducting plates, caps engaging sides of said panel and located in the spaces between said bus bars and said panel, said caps including means electrically connecting one of said conducting plates only to one of said bus bars and the other of said conducting plates only to the other of said bus bars, means carried by said frame biasing said bus bars into electrical contact with said caps and said conducting plates, cover means tightly engaging said frame above the non-light producing side of said panel, said cover means being coextensive with the periphery of said frame for holding said bus bars and said panel in position and preventing undesirable material from entering said fixture, and means for electrically connecting said bas bars to an energized electric potential.

4. A lighting fixture comprising a peripheral frame encompassing said fixture, opposed strip-like electric conducting means spaced from the inner sides of said frame, strip-like electric conductor extensions from an adjacent lighting fixture located at least partially in the space between said electric conducting means and said frame, means carried by said frame urging said conductor extensions into electrical contact with said electric conducting means, a panel-like light source engaging said electric conducting means, means on said frame supporting said electric conducting means and said light source, sealing means around said panel preventing undesirable material from contacting said light source, and means for connecting said electric conducting means to a source of electric energy.

5. A lighting fixture comprising a peripheral frame encompassing said fixture, opposing bus bars extending along inner sides of said fixture and supported by said frame with the sides of said bus bars being spaced from the sides of said frame, bus bar extensions from an adjacent lighting fixture located at least partiallly in the space between said bus bars and said frame, biasing means carried by said frame urging said bus bar extensions into electrical contact with said bus bars, an electroluminescent panel located generally between said bus bars and supported by said frame, said bus bars having a portion protruding above said panel, cover means tightly engaging said frame above the non-light producing side of said panel, said cover means being coextensive with the periphery thereof for holding said bus bars and said panel in position and preventing undesirable material from entering said fixture, and means for electrically connecting said bus bars to an energized electric potential and said panel.

6. In a row of generally rectangular lighting fixture, a pair of adjacent fixtures at one end of said row, each of said fixtures including a frame having an inwardly extending flange portion defining a bottom opening, illumination means engaging said fixture within said bottom opening to transmit light therethrough, bus bars electrically connected to said illumination means and being located in opposing positions along the length of said fixture and insulated therefrom, said bus bars being secured adjacent to but spaced from inner sides of said frame, said frame including slots therein communicating with the spaces between said bus bars and said frame and with the outside of said fixture, extensions of the bus bars from one of said adjacent fixtures passing through the slots of the other of said adjacent fixture and being located in the spaces between the latter fixtures bus bars and frame, means electrically engaging said extensions with said latter fixtures bus bars, and means for electrically connecting said latter fixtures bus bars with a source of electric potential.

7. In a row of lighting fixtures, a pair of adjacent fixtures at one end of said row, each of said fixtures including a frame having an inwardly extending flange portion defining a bottom opening, illumination means engaging said fixture within said bottom opening to transmit light therethrough, bus bars electrically connected to said illumination means and being located in opposing positions along the length of said fixture, said bus bars being secured adjacent to but spaced from the inner sides of said frame, said frame including slots communicating with the spaces between said bus bars and said frame and with the outside of said fixture, extensions of the bus bars from one of said adjacent fixtures being passed through the slots of the other of said adjacent fixture and being located in the spaces between the latter fixture bus bars and frame, biasing means carried by said frame urging said extensions into electrical contact with said latter fixtures bus bars, a terminal connecting member located adjacent the end of said row, said member including means receiving extensions from said latter fixtures bus bars and electrically connecting them with a source of electric potential.

8. In a row of lighting fixtures, a pair of adjacent fixtures at one end of said row, an inverted T-shaped supporting member located between said fixtures, each of said fixtures including a frame and having bus bars located in opposing positions along the length of said fixture, said fixtures frames supported on the bottom flanges of said supporting member, said bus bars located adjacent to but spaced from inner sides of said frame, said frame including slots communicating with the spaces between said bus bars and said frame and with the outside of said fixture, openings in said supporting member in registration with said slots, insulating sleeves located in said openings, extensions of the bus bars from one of said adjacent fixtures being passed through said sleeves and the slots of the other of said adjacent fixture and being located in the spaces between the latter fixtures bus bars and frame, means electrically engaging said extensions with said latter fixtures bus bars, and means for electrically connecting said latter fixtures bus bars with a source of electric potential.

References Cited in the file of this patent

UNITED STATES PATENTS

| | | |
|---|---|---|
| 2,650,310 | White | Aug. 25, 1953 |
| 2,821,646 | Walker | Jan. 28, 1958 |
| 2,863,061 | Destriau | Dec. 2, 1958 |
| 2,906,811 | Fisher | Sept. 29, 1959 |
| 2,962,582 | Croft | Nov. 29, 1960 |
| 2,992,351 | Van Den Houten et al. | July 11, 1961 |
| 3,015,747 | Rosenberg | Jan. 2, 1962 |